(12) United States Patent
Lee et al.

(10) Patent No.: US 6,894,830 B2
(45) Date of Patent: May 17, 2005

(54) BI-DIRECTIONAL OPTICAL-AMPLIFIER MODULE

(75) Inventors: Chang-Hee Lee, Taejonkwangyok-shi (KR); Yun-Je Oh, Suwon-shi (KR); Seong-Taek Hwang, Pyeongtaek-shi (KR); Hyun Deok Kim, Taegukwangyok-shi (KR); Jeong-Hun Shin, Taegukwangyok-shi (KR); Yunhee Cho, Seoul (KR)

(73) Assignee: Samsung Electronics Co, Ltd., Suwon-Si (KR)

( * ) Notice: Subject to any disclaimer, the term of this patent is extended or adjusted under 35 U.S.C. 154(b) by 453 days.

(21) Appl. No.: 10/054,322

(22) Filed: Jan. 22, 2002

(65) Prior Publication Data
US 2002/0118446 A1 Aug. 29, 2002

(30) Foreign Application Priority Data
Feb. 23, 2001 (KR) .......................................... 2001-9129

(51) Int. Cl.[7] .............................. H01S 3/10; G02F 1/35; H04B 10/16
(52) U.S. Cl. .................................. 359/341.2; 359/337.2
(58) Field of Search ............................ 359/337.2, 341.2

(56) References Cited

U.S. PATENT DOCUMENTS

| 5,452,124 A | 9/1995 | Baker .......................... 359/341 |
| 5,563,733 A | 10/1996 | Mitsuda et al. .............. 359/341 |

(Continued)

FOREIGN PATENT DOCUMENTS

| EP | 0926848 A2 | 6/1999 | ........... H04B/10/17 |
| EP | 11-177493 | 6/1999 | ........... H04B/10/17 |
| JP | 6-188494 | * 8/1994 | |
| JP | 6-342952 | * 12/1994 | |
| JP | 06-342952 | * 12/1994 | |
| JP | 09-179151 | 7/1999 | ............. G02F/1/35 |
| WO | WO 98/05133 | 2/1998 | ......... H04B/10/213 |

OTHER PUBLICATIONS

Park et al, Wavelength Interleaved Bidirectional Add/Drop Amplifier Module, IEEE Photonics Technology Letters, vol. 12, #2, pp 326–328, Feb. 2000.*

(Continued)

Primary Examiner—Nelson Moskowitz
(74) Attorney, Agent, or Firm—Cha & Reiter, LLC

(57) ABSTRACT

Disclosed is a bi-directional optical-amplifier module including first through fourth optical amplifiers, a mid-stage device for performing a desired signal processing for an upward or downward optical signal passing therethrough, a first optical-signal-path-setting device for supplying an optical signal inputted to a first input/output terminal of the bi-directional optical-amplifier module while outputting an optical signal outputted from the fourth optical amplifier to the first input/output terminal, a second optical-signal-path-setting device for supplying an optical signal inputted to a second input/output terminal of the bi-directional optical-amplifier module while outputting an optical signal outputted from the third optical amplifier to the second input/output terminal, a third optical-signal-path-setting device for outputting an optical signal outputted from the first optical amplifier to a first input/output terminal of the mid-stage device while supplying an optical signal outputted from the first input/output terminal of the mid-stage device to the fourth optical amplifier, and a fourth optical-signal-path-setting device for outputting an optical signal outputted from the second optical amplifier to a second input/output terminal of the mid-stage device while supplying an optical signal outputted from the second input/output terminal of the mid-stage device to the third optical amplifier.

47 Claims, 11 Drawing Sheets

U.S. PATENT DOCUMENTS

| | | | | |
|---|---|---|---|---|
| 5,633,741 A | * | 5/1997 | Giles | 398/79 |
| 5,812,306 A | * | 9/1998 | Mizrahi | 359/341.2 |
| 5,815,308 A | | 9/1998 | Kim et al. | 359/341 |
| 5,995,259 A | * | 11/1999 | Meli et al. | 398/92 |
| 6,018,408 A | | 1/2000 | Hong | 359/201 |
| 6,157,475 A | * | 12/2000 | Dugan et al. | 398/26 |
| 6,377,395 B2 | * | 4/2002 | Sugaya et al. | 359/341.41 |
| 6,388,805 B1 | * | 5/2002 | Spock et al. | 359/341.2 |

OTHER PUBLICATIONS

Farre et al, Design of bidirectional communication systems with optical amplifiers, IEEE Photonics Technology Letters, vol. 4, #4, 4/93.*

Delavaux; et al. "Repeatered Bidirectional 10 Gb/s–240 km Fiber Transmission Experiment"; Optical Fiber Technology 2, (1996), Article No. 0040, pp. 351–357.

Khaleghi; et al. "Increasing Repeater Span in High–Speed Bidirectional WDM Transmission Systems Using a New Bidirectional EDFA Configuration"; IEEE Photonics Technology Letters, vol. 8, No. 9, Sep. 1996, pp. 1252–1254.

Radic; et al. "25GHz interleaved bidirectional transmission at 10Gb/s"; Technical Digest, Optical Amplifiers and Their Applications; Optical Society of America, Conference Edition, Jul. 9–12, 2000; Sponsored by IEEE/Lasers and Electro–Optics Society, pp. PD7–1–PD7–3.

Kim; et al. "2.5 Gb/s × 16–Channel Bidirectional WDM Transmission System Using Bidirectional Erbium–Doped Fiber Amplifier Based on Spectrally Interleaved Synchronized Etaton Filters"; IEEE Photonics Technology Letters, vol. 11, No. 6, Jun. 1999, pp. 745–747.

* cited by examiner

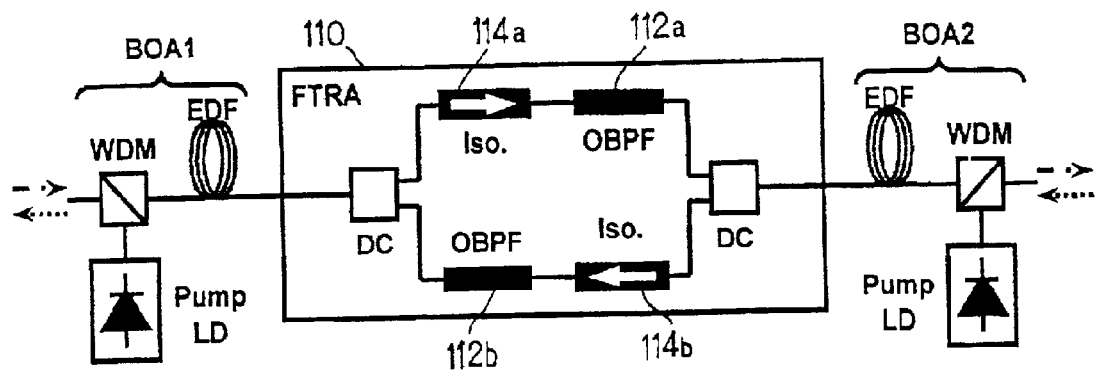
FIG. 1A [PRIOR ART]
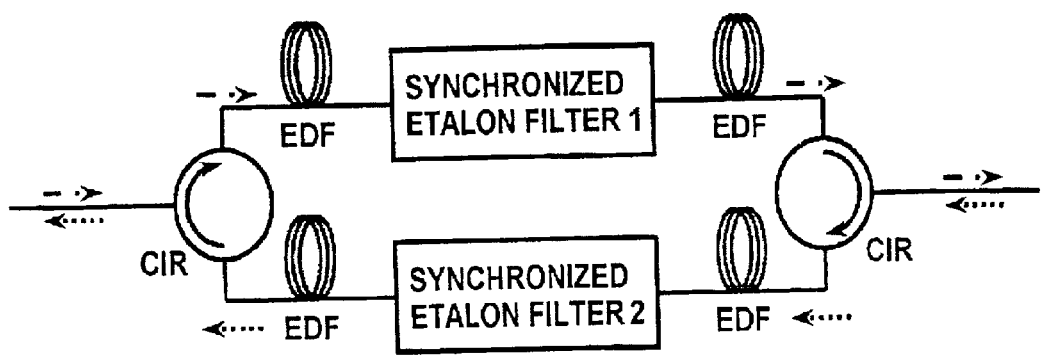
FIG. 1B [PRIOR ART]

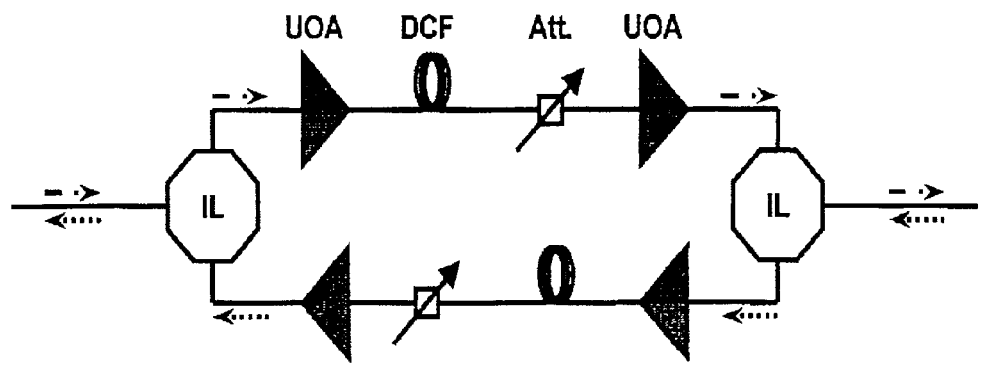
FIG. 1C [PRIOR ART]
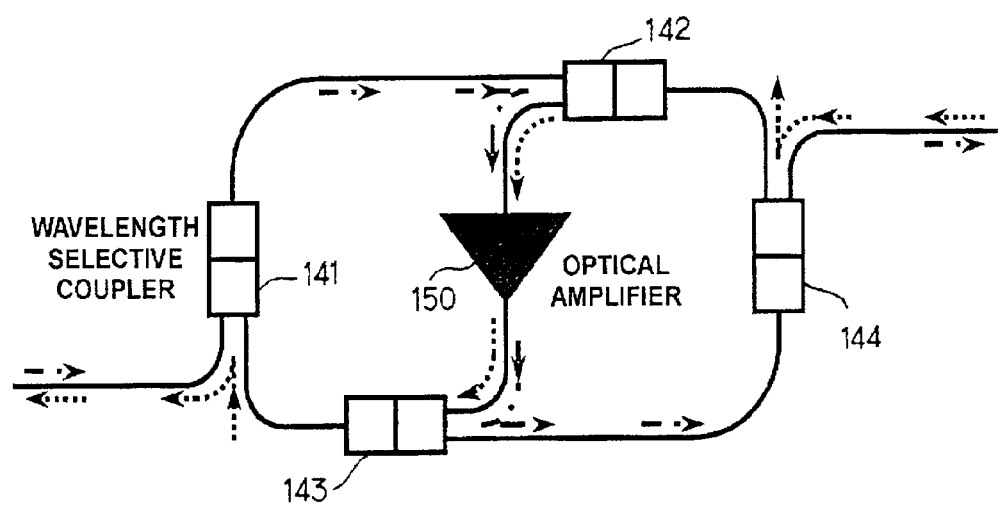
FIG. 1D [PRIOR ART]

BI-DIRECTIONAL OPTICAL-AMPLIFIER MODULE

CLAIM OF PRIORITY

This application makes reference to, incorporates the same herein, and claims all benefits accruing under 35 U.S.C. Section 119 from an application for "Bi-directional Optical-amplifier module," filed in the Korean Industrial Property Office on Feb. 23, 2001 and there duly assigned Ser. No. 2001-9129.

BACKGROUND OF THE INVENTION

1. Field of the Invention

The present invention relates to a bi-directional optical-amplifier module (OAM) for compensating optical signal loss caused by optical fibers or optical components in an optical transmission system, and more particularly to a multi-stage bi-directional OAM that is capable of suppressing the undesirable multiple reflections in an optical communication system.

2. Description of the Related Art

In a bi-directional optical transmission system, one or more multiplexed optical signals are transmitted in the opposite direction through a single optical fiber. As such, this type of bi-directional transmission system has advantages in that it provides an efficient way of utilizing optical fibers to increase transmission capacity and reduce optical non-linearity in an optical fiber. However, a degradation in optical signals may result from the multiple-reflected light that is generated by Rayleigh-back scattering in the optical fiber and the optical reflection in the optical elements. If the optical amplifiers were used, a further degradation of optical signals may occur due to the amplification of the reflected light. In order to minimize the degradation in optical signals, it is necessary to limit the gain of the optical amplifiers. Thus, it is desirable to use an optical amplifier capable of efficiently amplifying optical signals, while suppressing the multiple reflection of the optical signals.

FIGS. 1a to 1d are schematic diagrams illustrating the OAMs used in the conventional bi-directional optical-transmission systems. The optical-amplifier modules illustrated in FIGS. 1a to 1d propose various configurations for suppressing the multiple reflected light.

The configuration of the bi-directional OAM shown in FIG. 1a is described in U.S. Pat. No. 5,815,308 (entitled "Bi-directional Optical Amplifier). As shown in FIG. 1a, a frequency-tunable-reflection attenuator (FTRA) 110 is interposed between the bi-directional optical amplifiers BOA1 and BOA2 to suppress the multiple reflection of optical signals. The FTRA 110 includes a directional coupler (DC), two optical-band-pass filters (OBPF) 112a and 112b respectively having different pass bands, and two isolators (Iso) 114a and 114b. The function of FTRA110 is to attenuate the reflected light caused by the isolators 114a and 114b or the OBPFs 112a or 112b. Each of the bi-directional optical amplifiers BOA1 and BOA2 includes an erbium-doped fiber amplifier (EDF), a pump-laser diode (pump LD), and a wavelength-division multiplexer (WDM) for applying pumped light to the EDF.

The configuration of bi-directional OAM shown in FIG. 1b is described in C. H. Kim and Y. C. Chung, 2.5 Gb/s× 16-Channel Bi-directional WDM Transmission System Using Bi-directional Erbium-doped Fiber Amplifier Based on Spectrally-Interleaved-Synchronized Etalon Filters, *IEEE Photon. Technol. Lett.*, Vol. 11, No. 6, pp. 745–747, June 1999. The module includes a pair of two-stage uni-directional amplifiers coupled together by optical circulators (Cir). In this module, the suppression of multiple-reflected light is achieved by the optical circulators along with synchronized etalon filters of different pass bands, each arranged at mid-stage of the associated two-stage uni-directional amplifier between two EDFs included in the two-stage uni-directional amplifier.

The configuration of the bi-directional OAM shown in FIG. 1c is described in S. Radic, A. Srivastava, T. Nielsen, J. Centanni, and C. Wolf, 25 GHz Interleaved Bi-directional transmission at 10 Gb/s, in *Proc. Optical Amplifier and Their Applications* '2000, PD7, 2000. The module includes a pair of two-stage uni-directional amplifiers coupled together by wavelength interleavers (IL). In this module, the suppression of multiple-reflected light is achieved by the wavelength interleavers along with isolators respectively provided at the uni-directional optical amplifiers (UOA) included in each of the two-stage uni-directional amplifiers.

The configuration of bi-directional OAM shown in FIG. 1d is described in U.S. Pat. No. 6,018,408 (entitled "Bi-directional Optical Telecommunication System Comprising a Bi-directional Optical Amplifier). In this module, optical waves, which travel bi-directionally, are separated from each other by a wavelength-selective coupler (WSC), then coupled together by another WSC so that they can travel in the same direction. The resultant signal is then amplified by a uni-directional optical amplifier. The output from the uni-directional optical amplifier is split by another WSC into two signals, which are applied to different WSCs, respectively, so that they are bi-directionally traveled. This procedure is indicated by the dotted line arrow in FIG. 1d. The optical signal first passes through a first WSC 141. The optical signal emerging from the first WSC 141 is reflected by a second WSC 142, then applied to a uni-directional optical amplifier 150. The optical signal outputted from the uni-directional optical amplifier 150 is reflected by a third WSC 143, then sent to a fourth WSC 144, which enables the optical signal to travel in the right direction. In this module, the suppression of multiple-reflected light is achieved by the WSCs along with an isolator provided at the uni-directional optical amplifier.

Where it is desirable to increase the bit rate of the channel or the number of multiplexed channels for an increase in the capacity of a bi-directional optical-transmission system, a dispersion-compensating fiber (DCF) and a gain-flattening filter should be used. Generally, such elements are arranged at the mid-stage of a multi-stage optical amplifier in order to minimize a reduction in signal-to-noise ratio. However, it is difficult for those elements to be effectively incorporated in the conventional OAMs, as shown in FIGS. 1a to 1d.

For example, as shown in FIG. 1a, optical signals, which travel bi-directionally, can be simultaneously amplified by each of the bi-directional optical amplifiers BOA1 and BOA2. However, if a dispersion-compensating fiber exhibiting an increased Rayleigh-back scattering is used, it is necessary to provide a dispersion-compensating fiber at the FTRA 110. That is, separate mid-stage elements must be used for the respective travel directions of optical signals. In addition, as the bi-directional optical amplifiers BOA1 and BOA2 used in the optical-amplifier module are configured without using any isolator, the undesirable lasing or other unstable phenomena may occur. For OAM of FIG. 1b or 1c, separate two-state uni-directional optical amplifiers are used for the respective travel directions of optical signals. For this reason, it is necessary to use separate mid-stage elements for the respective travel directions of optical signals. Furthermore, as shown in FIG. 1d, although it is possible to amplify the bi-directionally-traveling optical signals while achieving a compensation for color dispersion, the signals may be degraded due to the nonlinearity of the DCF as the bi-directionally-traveling optical signals are transmitted in the same direction in the DCF.

As mentioned above, the bi-directional optical transmission technique for bi-directionally transmitting optical signals using a single optical fiber is an efficient scheme to increase the capacity of an optical-transmission system or optical communication network through a single optical fiber. However, this technique has a problem in that the optical-transmission system or optical-communication network may have a limited performance due to the multiple-reflection of optical signals that is caused by Rayleigh-back scattering or various reflections occurring in the optical fiber. In particular, where the optical-transmission system or optical-communication network uses an optical amplifier, the amplification and accumulation of multiple-reflected lights are generated. As a result, the gain of the optical amplifier is limited.

SUMMARY OF THE INVENTION

The present invention overcomes the above-described problems, and provides additional advantages by providing a bi-directional optical-amplifier module that is capable of obtaining an increased gain while suppressing the multiple reflection caused by the internal optical components.

One aspect of the invention is to provide a bi-directional optical-amplifier module having an inexpensive configuration.

Another aspect of the invention is to provide a bi-directional optical amplifier that is capable of preventing nonlinearity in a dispersion-compensating fiber while achieving stability in the dispersion-compensating fiber.

A further aspect of the invention provides a bi-directional optical-amplifier module, which includes: a first optical amplifier; a second optical amplifier; a third optical amplifier; a fourth optical amplifier; a mid-stage device for performing a desired signal processing for an upward or downward optical signal passing therethrough; a first optical-signal-path-setting device for supplying an optical signal inputted to a first input/output terminal of the bi-directional optical-amplifier module, while outputting an optical signal outputted from the fourth optical amplifier to the first input/output terminal; a second optical-signal-path-setting device for supplying an optical signal inputted to a second input/output terminal of the bi-directional-optical-amplifier module, while outputting an optical signal outputted from the third optical amplifier to the second input/output terminal; a third optical-signal-path-setting device for outputting an optical signal outputted from the first optical amplifier to a first input/output terminal of the mid-stage device, while supplying an optical signal outputted from the first input/output terminal of the mid-stage device to the fourth optical amplifier; and a fourth optical-signal-path-setting device for outputting an optical signal outputted from the second optical amplifier to a second input/output terminal of the mid-stage device, while supplying an optical signal outputted from the second input/output terminal of the mid-stage device to the third optical amplifier.

BRIEF DESCRIPTION OF THE DRAWINGS

The above advantages of the present invention will become more apparent by describing in detail preferred embodiments thereof with reference to the attached drawings in which:

FIGS. 1a to 1d are schematic diagrams illustrating the conventional optical-amplifier modules used in bi-directional optical-transmission systems;

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 2:
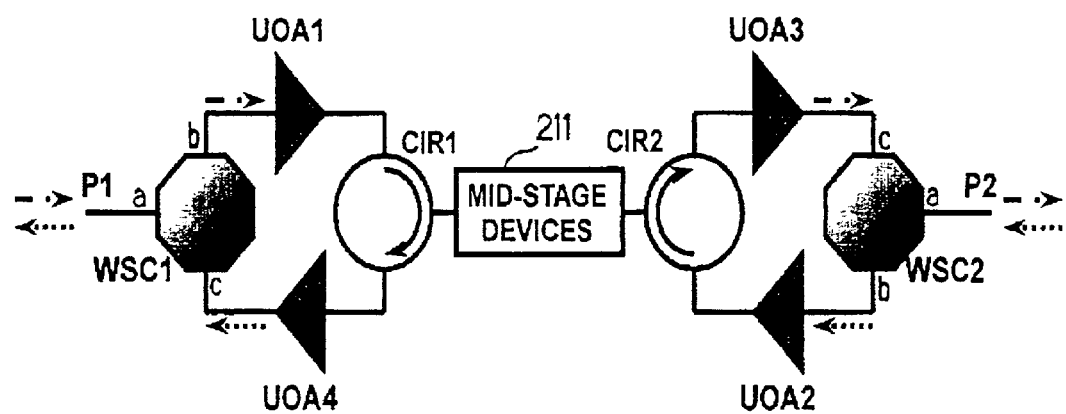
FIG. 2 is a schematic view illustrating a bi-directional optical-amplifier module according to an embodiment of the present invention.

Referring to FIG. 2, the bi-directional optical-amplifier module (OAM) according to an embodiment of the present invention is illustrated. As shown in FIG. 2, the OAM receives, at its first input/output terminal P1, a downward optical signal traveling from left to right while outputting an upward optical signal traveling from right to left in an amplified state. The OAM also receives, at its second input/output terminal P2, the upward optical signal while outputting the downward optical signal in an amplified state.

The downward signal inputted to the first input/output terminal P1 is amplified by a first uni-directional optical amplifier UOA1 after passing through a first wavelength-selective coupler WSC1. The amplified downward signal is applied to a mid-stage device 211 after passing through a first circulator Cir1. Thereafter, the downward signal emerging from the mid-stage device 211 is amplified by a third uni-directional optical amplifier UOA3 after passing through a second circulator Cir2, and finally outputted at the second input/output terminal P2 after passing through a second wavelength-selective coupler WSC2.

On the other hand, the upward signal inputted to the second input/output terminal P2 is amplified by a second uni-directional optical amplifier UOA2 after passing through the second wavelength-selective coupler WSC2. The amplified upward signal is applied to the mid-stage device 211 after passing through the second circulator Cir2. Thereafter, the upward signal emerging from the mid-stage device 211 is amplified by a fourth uni-directional-optical amplifier UOA4 after passing through the first circulator Cir1, and finally outputted at the first input/output terminal P1 after passing through the first wavelength-selective coupler WSC1.

The mid-stage device 211 incorporated in the optical-amplifier module according to the present invention may comprise a dispersion-compensating fiber, a fiber-gain flattening element, an amplified-stimulated-emission (ASE) rejection filter adapted to suppress the accumulation of noise in an optical amplifier, or a variable attenuator adapted to control the power of optical signals.

Meanwhile, the uni-directional optical amplifiers UOA1, UOA2, UOA3, and UOA4 may comprise semiconductor optical amplifiers, diverse, rare earth-doped fiber amplifiers using erbium (Er), praseodymium (Pr), or thulium (Tm), or Raman amplifiers. An optical isolator may be incorporated in such optical amplifiers in order to amplify optical signals, which travel uni-directionally.

As shown in FIG. 2, each of the wavelength-selective couplers WSC1 and WSC2 includes a common terminal a connected to an associated one of the input/output terminals P1 and P2, an output terminal b connected to the input terminal of an associated one of the first and second uni-directional optical amplifiers UOA1 and UOA2, and an input terminal c connected to the output terminal of an associated one of the third and fourth uni-directional optical amplifiers UOA3 and UOA4. In each of the wavelength-selective couplers WSC1 and WSC2, optical signals of a specific wavelength are transmitted between the common terminal a and the output terminal b, whereas optical signals of wavelengths other than the specific wavelength are transmitted between the common terminal a and the input terminal C.

Wavelengths of optical signals bi-directionally transmittable in the optical-amplifier module shown in FIG. 2 are determined according to the signal transmission characteristics of the wavelength-selective couplers used in the optical-amplifier module. The wavelengths of optical signals transmitted through the wavelength-selective couplers can be distinguished from one another in a band-split fashion or in a wavelength-interleaved fashion. In accordance with the band-splitting method, the wavelengths of downward and upward signals transmitted in opposite directions are arranged in different bands. In accordance with the wavelength-interleaving method, the wavelengths of downward and upward signals transmitted in opposite directions are alternately arranged in an interleaved fashion while being adjacent to each other.

Figure 3A:
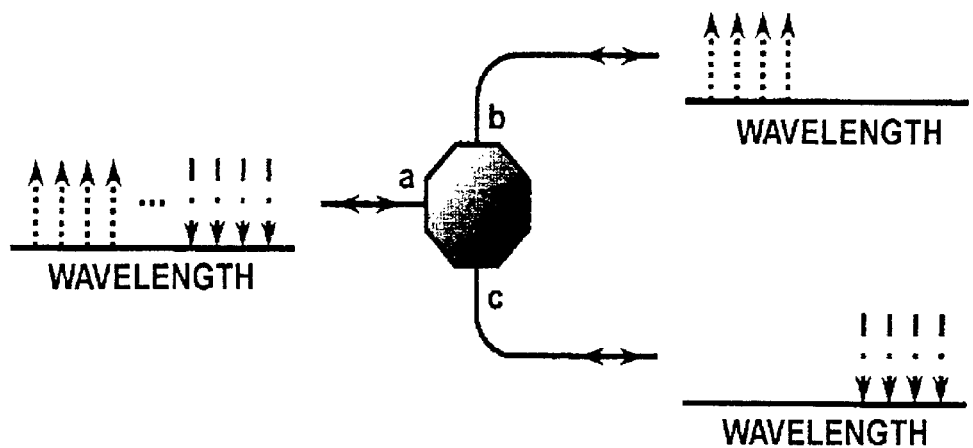
FIGS. 3a to 3d are schematic views respectively illustrating various configurations of a wavelength-selective coupler shown in FIG. 2.

Now, the configuration and operation of a wavelength-selective coupler will be described in detail, in conjunction with FIGS. 3a to 3d. FIG. 3a illustrates an example of a wavelength-selective coupler configured to separate/couple bi-directional signals arranged in a band-split fashion. This wavelength-selective coupler is used in the case in which optical signals transmittable between a common terminal a and an output terminal b, and between the common terminal a and an input terminal c have wavelengths arranged in different bands. A representative example of such a wavelength-selective coupler is a wavelength-division multiplexer (WDM).

Figure 3B:
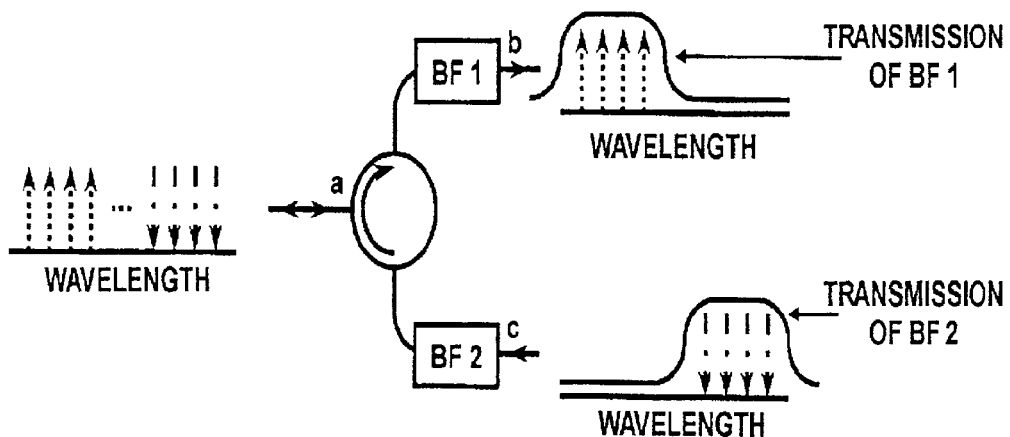

Such a wavelength-selective coupler, which can separate/couple bi-directional signals having wavelengths arranged in a band-split fashion, as shown in FIG. 3a, may be implemented using one circulator, and two bandpass filters, as shown in FIG. 3b. The bandpass filters used in this case have opposite passbands, and opposite cut-off bands, respectively. That is, the wavelength-selective coupler includes a circulator Cir having one input terminal c, one output terminal b, and one common terminal a; a first bandpass filter BF1 having one input terminal and one output terminal to transmit an optical signal of a specific wavelength band, while cutting off the optical signals of other wavelength bands; and, a second bandpass filter BF2 having one input terminal and one output terminal with a passband and a cut-off band opposite to those of the first bandpass filter BF1. The circulator Cir is connected at its output terminal b to the input terminal of the first bandpass filter BF1 while being connected at its input terminal c to the output terminal of the second bandpass filter BF2.

Figure 3C:
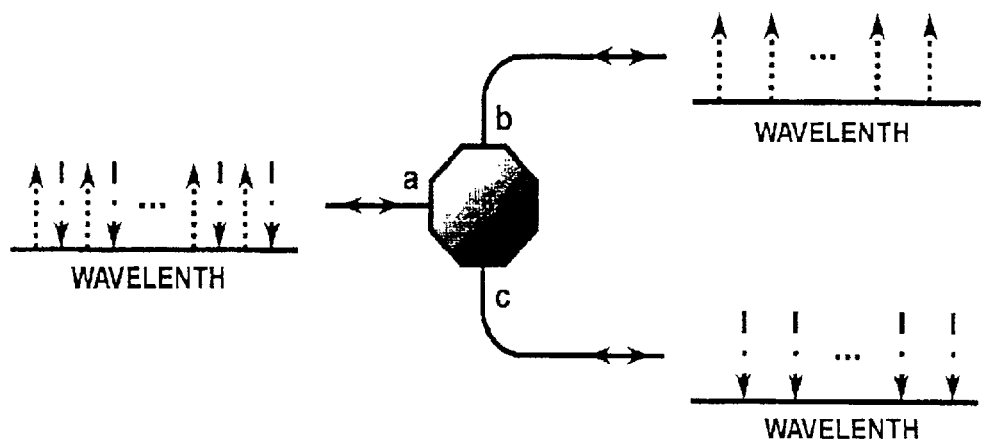

FIG. 3c illustrates an example of a wavelength-selective coupler configured to separate/couple bi-directional signals arranged in a wavelength-interleaved fashion. This wavelength-selective coupler is used in the case where optical signals transmittable between a common terminal a and an output terminal b and between the common terminal a and an input terminal c have wavelengths alternately arranged in an interleaved fashion while being adjacent to each other. A representative example of such a wavelength-selective coupler is a wavelength interleaver.

Figure 3D:
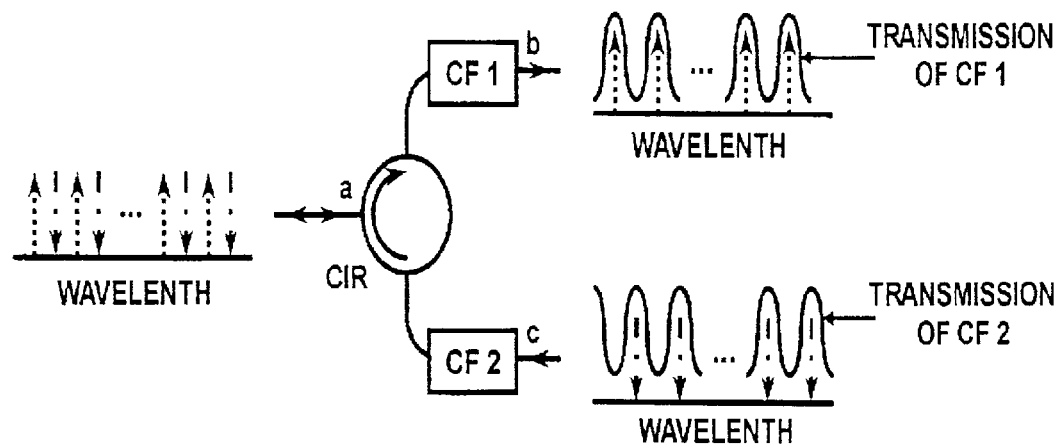

Such a wavelength-selective coupler, which can separate/couple bi-directional signals having wavelengths arranged in an interleaved fashion, may be implemented using one circulator, and two-comb filters, as shown in FIG. 3d. The bandpass filters used in this case have passbands repeated at a constant interval while having absolute values spaced apart from one another by half the interval, respectively. That is, the wavelength-selective coupler includes: a circulator Cir having one input terminal c, one output terminal b, and one common terminal a; a first comb filter CF1 having one input terminal and one output terminal with passbands or cut-off bands repeated at a desired interval; and, a second comb filter CF2 having a cut-off band/passband corresponding to the passband/cut-off band of the first comb filter CF1. The circulator Cir is connected at its output terminal b to the input terminal of the first comb filter CF1 while being connected at its input terminal c to the output terminal of the second comb filter CF2.

Figure 4:
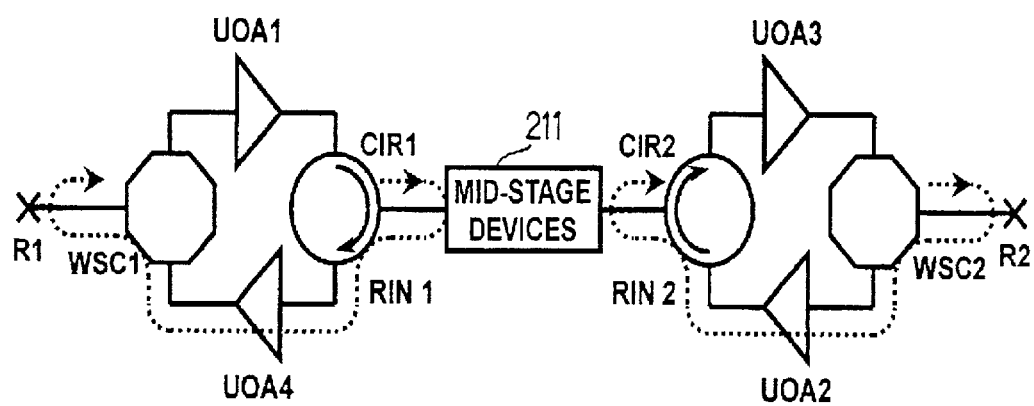
FIG. 4 is a schematic diagram illustrating the generation of relative-intensity-noise path caused by the multiple reflection shown in FIG. 2.

FIG. 4 illustrates a generation path of the relative-intensity noise (RIN) caused by multiple reflection in the bi-directional optical-amplifier module of FIG. 2. Although the RIN generation path shown in FIG. 4 is associated only with downward signals, there is a similar RIN generation path associated with upward signals. In FIG. 4, "R1" and "R2" represent reflectivities of the transmission optical fiber respectively measured at two input/output terminals P1 and P2. The transmission optical fiber involves the reflection of light caused by Rayleigh-back scattering.

There are two generation paths of relative-intensity noise mainly generated in the bi-directional optical-transmission system using the optical-amplifier module according to the present invention. Relative-intensity noise generated along a first RIN generation path, that is, a first relative-intensity noise RIN1, is caused by the reflection of light occurring in the transmission optical fiber connected to the left side of the bi-directional optical-amplifier module and the mid-stage device 211. In this path, the downward signal inputted to the mid-stage device 211 is partially reflected. The reflected signal is amplified by the fourth uni-directional optical amplifier UOA4, cross-taken by the first wavelength-selective coupler WSC1, reflected again at a reflectivity of R1 in the transmission optical fiber, and combined with the downward signal. As a result, relative-intensity noise is generated. The relative-intensity noise generated in this path is attenuated one time by the first wavelength-selective coupler WSC1.

Relative-intensity noise generated along a second RIN generation path, that is, a second relative-intensity noise RIN2, is caused by reflection of light occurring in the mid-stage device 211, and the transmission optical fiber connected to the right side of the bi-directional optical-amplifier module. In this path, the downward signal is reflected at a reflectivity of R2 in the transmission optical fiber. The reflected signal is cross-taken by the second wavelength-selective coupler WSC2, amplified by the second uni-directional optical amplifier UOA2, reflected again by the mid-stage device 211, and combined with the downward signal. As a result, relative-intensity noise is generated. The relative-intensity noise generated in this path is attenuated one time by the second wavelength-selective coupler WSC2.

Thus, relative-intensity noise generated along different paths in the bi-directional optical transmission system using the optical-amplifier module according to the present invention is attenuated by the wavelength-selective couplers WSC1 and WSC2, respectively. Accordingly, it is possible to reduce the relative-intensity noise caused by multiple reflection causing a degradation of bi-directional optical-transmission systems and communication networks. In addition, even when a mid-stage device involving Rayleigh-back scattering and light reflection, such as a dispersion-compensating fiber, is used, it is also possible to reduce relative-intensity noise caused by those phenomena.

Figure 5A:
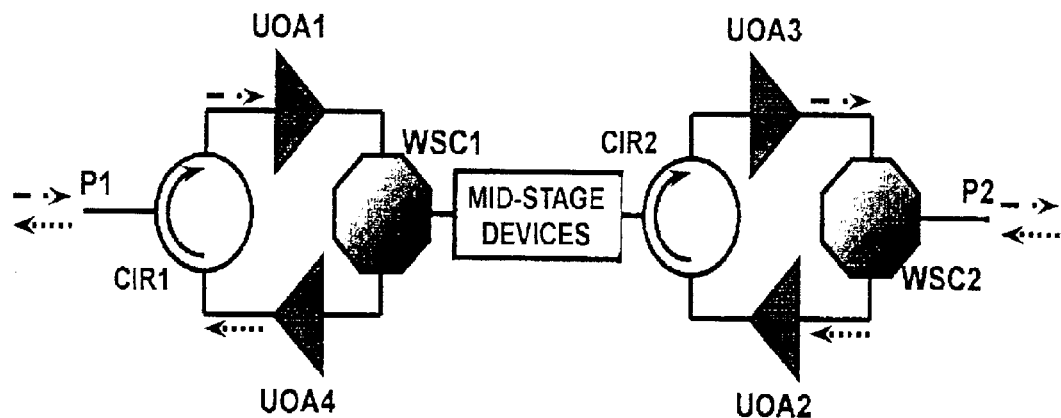
FIGS. 5a to 5e illustrate the bi-directional optical-amplifier modules according to various other embodiments of the present invention, respectively.
Figure 5B:
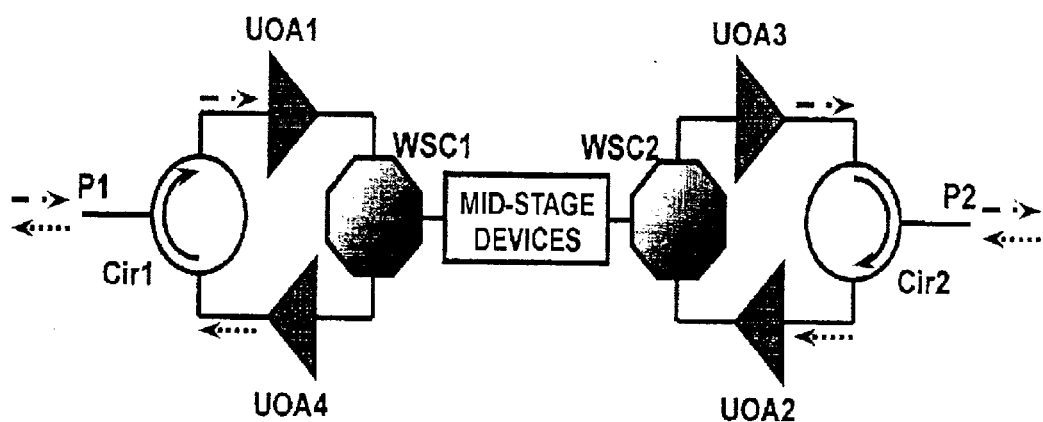

FIGS. 5a to 5e illustrate the bi-directional optical-amplifier modules according to other various embodiments of the present invention, respectively. The optical-amplifier module shown in FIG. 5a has the same configuration as the optical-amplifier module of FIG. 2, except that the positions of the first wavelength-selective coupler WSC1 and first circulator Cir1 are changed with each other. The optical-amplifier module shown in FIG. 5b has the same configuration as the optical-amplifier module of FIG. 5a, except that the positions of the second wavelength-selective coupler WSC2 and second circulator Cir2 are changed with each other. Relative-intensity noise generated in the optical-amplifier module of FIG. 5a or 5b is the same as the relative-intensity noise generated in the optical-amplifier module of FIG. 2.

Meanwhile, where each circulator used in the optical-amplifier module of FIG. 2 is substituted by two wavelength-selective couplers, it is possible to achieve a further reduction in relative-intensity noise. That is, in the case of the optical-amplifier module shown in FIG. 5c, relative-intensity noise RIN1 and RIN2 are attenuated one more time by the third and fourth wavelength-selective couplers WSC3 and WSC4, respectively.

Figure 5C:
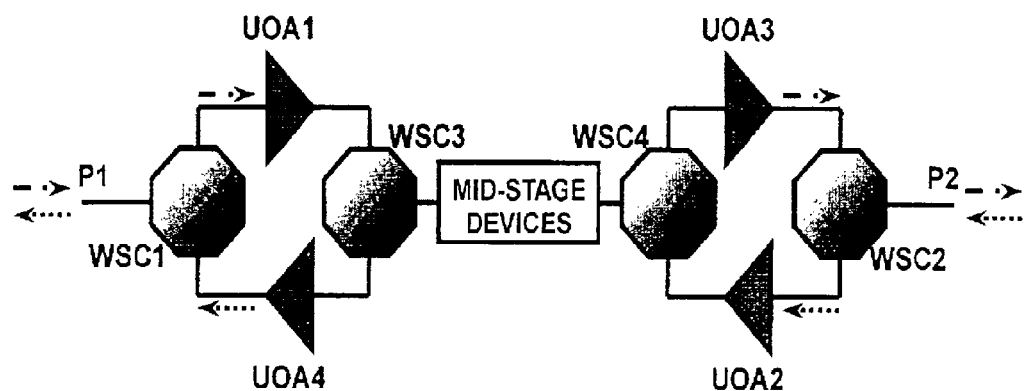
Figure 5D:
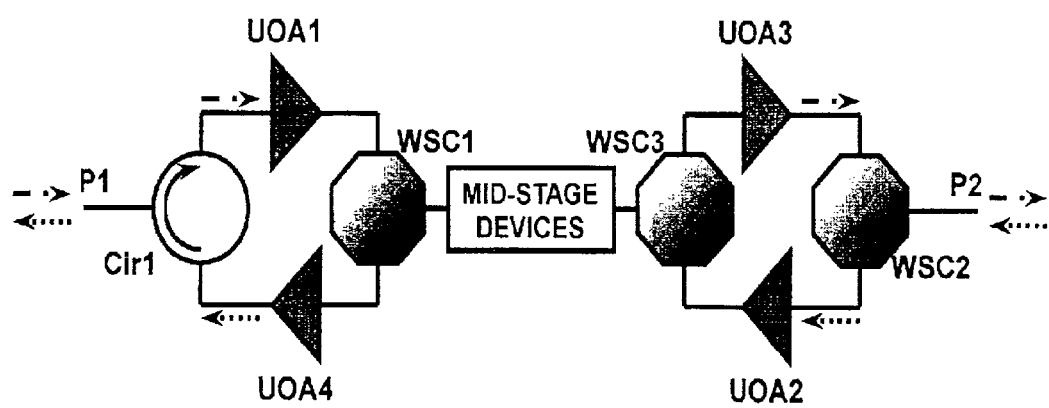
Figure 5E:
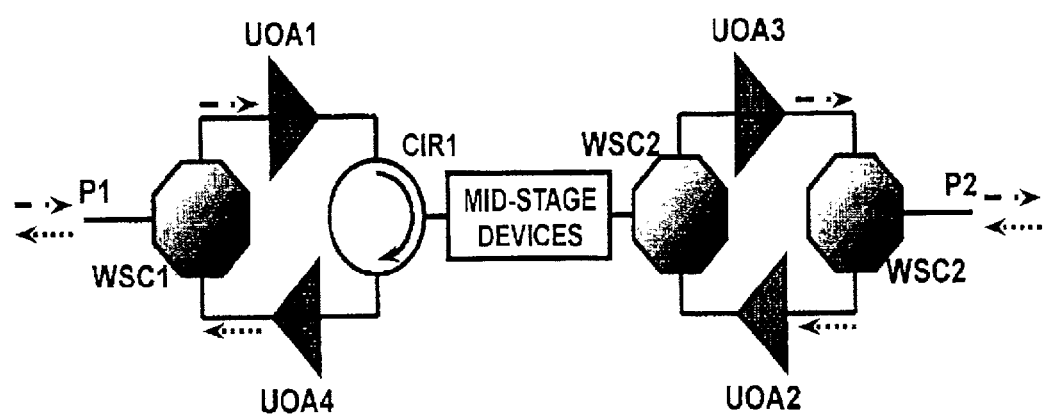

The optical-amplifier module shown in FIG. 5d can be embodied by substituting the first wavelength-selective coupler WSC1 of the optical-amplifier module shown in FIG. 5c by a circulator Cir1. Also, the optical-amplifier module shown in FIG. 5e can be embodied by substituting the third wavelength-selective coupler WSC3 by a circulator Cir1.

Figure 6:
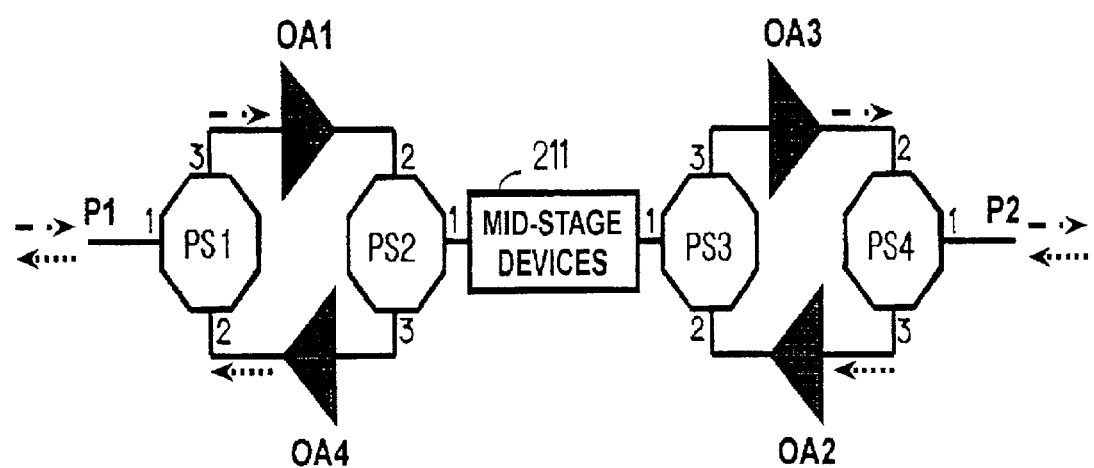
FIG. 6 is a schematic diagram illustrating the bi-directional-optical-amplifier module according to yet another embodiment of the present invention; and, FIG. 7 is a schematic diagram illustrating the configuration of an optical-amplifier module used in a bi-directional optical transmission system, which module has features of the present invention.

FIG. 6 is a schematic diagram illustrating the configuration of an optical-amplifier module used in a bi-directional optical transmission system, whereto the embodiment of the present invention may be applied. In particular, FIG. 6 generally shows the optical-amplifier modules shown in FIGS. 2 to 5 and includes: a first optical-signal-path-setting device PS1 for receiving a downward signal at a first terminal 1 thereof connected to a first input/output terminal P1 and outputting the received downward signal at a third terminal 3 thereof, while receiving an upward signal at a second terminal 2 thereof and outputting the received upward signal at the first terminal 1 thereof; a first optical amplifier OA1 for amplifying the downward signal outputted from the first optical-signal-path-setting device PS1; and, a fourth optical amplifier OA4 for amplifying the upward signal to be inputted to the second terminal 2 of the first optical-signal-path-setting device PS1. The optical-amplifier module also includes a second optical-signal-path-setting device PS2 for receiving the downward signal outputted from the first optical amplifier OA1 in an amplified state at a second terminal 2 thereof and for outputting the received downward signal at a first terminal 1 thereof, while receiving an upward signal at the first terminal 1 thereof and outputting the received upward signal to the fourth optical amplifier OA4 at a third terminal 3 thereof.

The optical-amplifier module further includes a fourth optical-signal-path-setting device PS4 for receiving an upward signal at a first terminal 1 thereof connected to a second input/output terminal P2 and outputting the received upward signal at a third terminal 3 thereof, while receiving a downward signal at a second terminal 2 thereof and outputting the received downward signal at the first terminal 1 thereof; a second optical amplifier OA2 for amplifying the upward signal outputted from the third terminal 3 of the fourth optical-signal-path-setting device PS4; and, a third optical amplifier OA3 for amplifying the downward signal to be inputted to the second terminal 2 of the fourth optical-signal-path-setting device PS4. The optical-amplifier module also includes a third optical-signal-path-setting device PS3 for receiving the upward signal outputted from the second optical amplifier OA2 in an amplified state at a second terminal 2 thereof and outputting the received upward signal at a first terminal 1 thereof, while receiving a downward signal at the first terminal 1 thereof and outputting the received downward signal to the third optical amplifier OA3 at a third terminal 3 thereof. The optical-amplifier module further includes a mid-stage device 211 connected at both terminals thereof with the respective first terminals of the second and third optical-signal-path-setting devices PS2 and PS3 and adapted to perform a desired signal processing for the downward and upward signals, respectively, inputted thereto from the second and third optical-signal-path-setting devices PS2 and PS3. The mid-stage device 211 may comprise: dispersion-compensating means; means for flattening the gain of the optical amplifier; and, means for removing accumulated noise of the optical amplifier and controlling power of optical signals, or a combination thereof. In this case, each of the optical-signal-path-setting devices may be a wavelength-selective coupler or a circulator.

Optical signals are transmitted in the optical-amplifier module having the configuration of FIG. 6 along the following paths. That is, the downward signal travels along the path of the first input/output terminal P1, the first optical signal path setting device PS1, the first optical amplifier OA1, the second optical-signal-path-setting device PS2, the mid-stage device 211, the third optical-signal-path-setting device PS3, the third optical amplifier OA3, the fourth optical-signal-path-setting device PS4, and the second input/output terminal P2. The upward signal travels along the path of the second input/output terminal P2, the fourth optical-signal-path-setting device PS4, the second optical amplifier OA2, the third optical-signal-path-setting device PS3, the mid-stage device 211, the second optical-signal-path-setting device PS2, the fourth optical amplifier OA4, the first optical-signal-path-setting device PS1, and the first input/output terminal P1.

Figure 7:
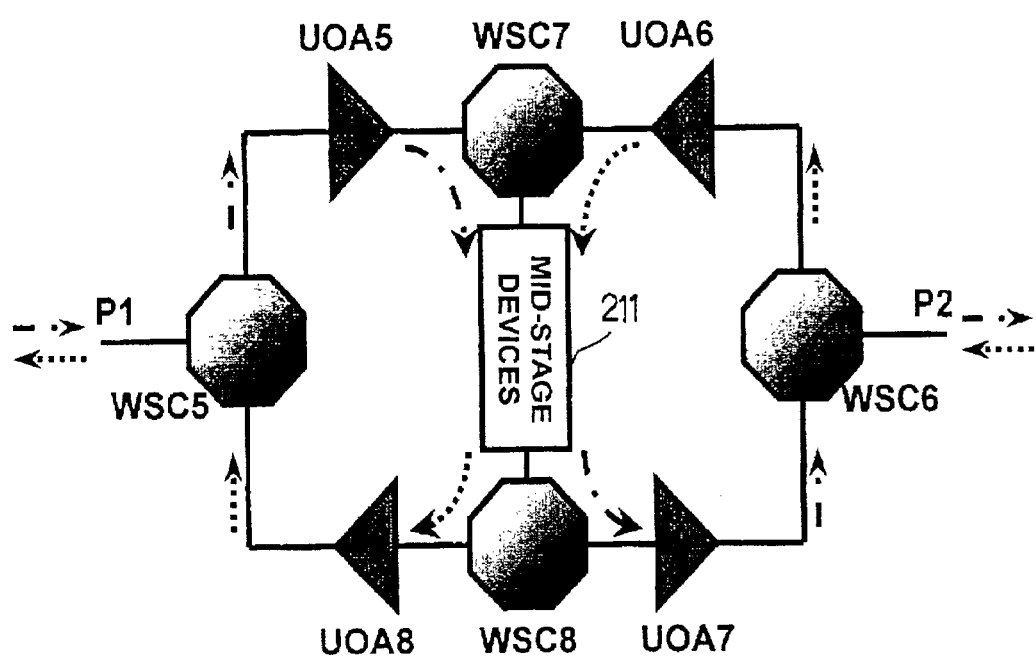

FIG. 7 illustrates a bi-directional-optical-amplifier module according to another embodiment of the present invention. Referring to FIG. 7, a downward signal (indicated by the dotted-line arrow), which is inputted to a first input/output terminal P1 of the optical-amplifier module, is amplified by a fifth uni-directional optical amplifier UOA5 after passing through a first wavelength-selective coupler WSC5, then combined with an upward signal (indicated by the dotted arrow) in a seventh wavelength-selective coupler WSC7. The resultant signal is applied to the mid-stage device 211. The downward signal outputted from the mid-stage device 211 is separated from the upward signal combined therewith by an eighth wavelength-selective coupler WSC8, then amplified by a seventh uni-directional optical amplifier UOA7. The amplified downward signal is outputted at a second input/output terminal P2 of the optical-amplifier module after passing through a sixth wavelength-selective coupler WSC6.

The upward signal, which is inputted to the second input/output terminal P2 of the optical-amplifier module, is amplified by a sixth uni-directional optical amplifier UOA6 after passing through the wavelength-selective coupler WSC6, then combined with a downward signal in the seventh wavelength-selective coupler WSC7. The resultant signal is applied to the mid-stage device 211. The upward signal outputted from the mid-stage device 211 is separated from the downward signal combined therewith by the eighth wavelength-selective coupler WSC8, then amplified by an eighth uni-directional optical amplifier UOA8. The amplified upward signal is outputted at the first input/output terminal P1 of the optical-amplifier module after passing through the fifth wavelength-selective coupler WSC5. In the optical-amplifier module of FIG. 7, upward and downward signals pass through the mid-stage device 211 in common, as in other embodiments described above. However, this embodiment is different from other embodiments in that the upward and downward signals travel in the same directions in the mid-stage device 211.

The above-described bi-directional amplifier module according to the present invention has the following advantages.

First, in the structure of the OAM according to the present invention, optical signals, which travel bi-directionally, pass through a single mid-stage device bi-directionally. Accordingly, it is unnecessary to use separate mid-stage devices for respective directions. Thus, it is possible to provide an inexpensive bi-directional optical-amplifier module and the manufacturing costs can be reduced.

Second, the OAM according to the present invention can minimize a degradation of signals occurring in the mid-stage device. For example, where a dispersion-compensating fiber is used for the mid-stage device, it may degrade bi-directionally-traveling optical signals as it has a small core area while generating an increased Rayleigh-back scattering. In accordance with the optical-amplifier module according to the present invention, however, the generation of relative-intensity noise is attenuated by the wavelength-selective couplers. The optical-amplifier module of the present invention is also configured to allow optical signals to pass through the dispersion-compensating fiber bi-directionally. As a result, it is possible to reduce the generation of an optical nonlinearity phenomenon.

Third, the bi-directional OAM according to the present invention is configured using uni-directional optical amplifiers each internally provided with an isolator. Thus, it is possible to prevent a lasing phenomenon from occurring in the optical amplifiers while achieving an improvement in stability.

While this invention has been described in connection with what is presently considered to be the most practical and preferred embodiment, it is to be understood that the invention is not limited to the disclosed embodiment; on the contrary, it is intended to cover various modifications within the spirit and scope of the appended claims.

What is claimed:

1. A bi-directional optical-amplifier module comprising:
   a first optical amplifier;
   a second optical amplifier;
   a third optical amplifier;
   a fourth optical amplifier;
   a mid-stage device for performing a desired signal processing for an upward or downward optical signal passing therethrough;
   a first optical-signal-path-setting device for supplying an optical signal inputted to a first input/output terminal of the bi-directional optical-amplifier module, while outputting an optical signal outputted from the fourth optical amplifier to the first input/output terminal;
   a second optical-signal-path-setting device for supplying an optical signal inputted to a second input/output terminal of the bi-directional optical-amplifier module, while outputting an optical signal outputted from the third optical amplifier to the second input/output terminal;
   a third optical-signal-path-setting device for outputting an optical signal outputted from the first optical amplifier to a first input/output terminal of the mid-stage device, while supplying an optical signal outputted from the first input/output terminal of the mid-stage device to the fourth optical amplifier; and,
   a fourth optical-signal-path-setting device for outputting an optical signal outputted from the second optical amplifier to a second input/output terminal of the mid-stage device, while supplying an optical signal outputted from the second input/output terminal of the mid-stage device to the third optical amplifier.

2. The optical-amplifier module of claim 1, wherein each of the first and fourth optical-signal-path-setting devices is a wavelength-selective coupler, and each of the second and third optical-signal-path-setting devices is a circulator.

3. The optical-amplifier module of claim 1, wherein each of the first and fourth optical-signal-path-setting devices is a circulator, and each of the second and third optical-signal-path-setting devices is a wavelength-selective coupler.

4. The optical-amplifier module of claim 1, wherein each of the first and third optical-signal-path-setting devices is a circulator, and each of the second and fourth optical-signal-path-setting devices is a wavelength-selective coupler.

5. The optical-amplifier module of claim 1, wherein each of the first through fourth optical-signal-path-setting devices is a wavelength-selective coupler.

6. The optical-amplifier module of claim 1, wherein one of the first through fourth optical-signal-path-setting devices is a circulator, and each of the remaining optical-signal-path-setting devices is a wavelength-selective coupler.

7. The optical-amplifier module of claim 1, wherein the mid-stage device comprises at least one of dispersion-compensating means, optical-fiber-gain flattening means, and means for removing accumulated noise of optical amplifiers and controlling the power of optical signals.

8. A bi-directional optical-amplifier module having first and second input/output ports to amplify downward/upward optical signals traveling bi-directionally, comprising:
   a first wavelength-selective coupler connected at a common terminal thereof to the first input/output port and adapted to perform a separation/combination of optical signals passing therethrough bi-directionally;

a first uni-directional optical amplifier connected at an input terminal thereof to an output terminal of the first wavelength-selective coupler;

a fourth uni-directional optical amplifier connected at an output terminal thereof to an input terminal of the first wavelength-selective coupler;

a first circulator connected to an output terminal of the first uni-directional optical amplifier and an input terminal of the fourth uni-directional optical amplifier at input and output terminals thereof, respectively;

a second wavelength-selective coupler connected at a common terminal thereof to the second input/output port and adapted to perform a separation/combination of optical signals passing therethrough bi-directionally;

a second uni-directional optical amplifier connected at an input terminal thereof to an output terminal of the second wavelength-selective coupler;

a third uni-directional optical amplifier connected at an output terminal thereof to an input terminal of the second wavelength-selective coupler;

a second circulator connected to an output terminal of the second uni-directional optical amplifier and an input terminal of the third uni-directional optical amplifier at input and output terminals thereof, respectively; and, a mid-stage device connected between the common terminals of the first and second circulators, the mid-stage device comprising at least one of dispersion-compensating means, optical-fiber-gain flattening means, and means for removing accumulated noise of optical amplifiers and controlling power of optical signals.

9. The optical-amplifier module of claim 8, wherein each of the uni-directional optical amplifiers is a rare earth-doped fiber amplifier, a semiconductor optical amplifier, or a Raman amplifier.

10. The optical-amplifier module of claim 8, wherein each of the wavelength-selective couplers comprises a wavelength multiplexer for coupling or separating optical signals having wavelengths of different bands.

11. The optical-amplifier module of claim 8, wherein each of the wavelength-selective couplers comprises a circulator having an input terminal, an output terminal, and a common terminal, a first bandpass filter connected to the input terminal of the circulator and adapted to transmit an optical signal of a predetermined wavelength band while cutting off optical signals of other wavelength bands, and a second bandpass filter connected to the output terminal of the circulator, the second bandpass filter having a passband and a cut-off band opposite to those of the first bandpass filter.

12. The optical-amplifier module of claim 8, wherein each of the wavelength-selective couplers comprises a wavelength interleaver for coupling or separating optical signals having wavelengths adjacent to each other.

13. The optical-amplifier module of claim 8, wherein each of the wavelength-selective couplers comprises: a circulator having an input terminal, an output terminal, and a common terminal; a first comb filter connected to an input terminal of the circulator, having passbands or cut-off bands repeated at a predetermined interval; and, a second comb filter connected to the output terminal of the circulator, having passbands or cut-off bands repeated at an interval corresponding to the interval of the first comb filter and an absolute value corresponding to half the interval of the first comb filter.

14. A bi-directional optical-amplifier module having first and second input/output ports to amplify downward/upward optical signals traveling bi-directionally, comprising:

a first circulator connected at a common terminal thereof to the first input/output port and adapted to perform a separation/combination of optical signals passing therethrough bi-directionally;

a first uni-directional optical amplifier connected to an input terminal thereof to an output terminal of the first circulator;

a fourth uni-directional optical amplifier connected to an output terminal thereof to an input terminal of the first circulator;

a first wavelength-selective coupler connected to an output terminal of the first uni-directional optical amplifier and an input terminal of the fourth uni-directional optical amplifier to input and output terminals thereof, respectively;

a second wavelength-selective coupler connected to a common terminal thereof to the second input/output port and adapted to perform a separation/combination of optical signals passing therethrough bi-directionally;

a second uni-directional optical amplifier connected at an input terminal thereof to an output terminal of the second wavelength-selective coupler;

a third uni-directional optical amplifier connected to an output terminal thereof to an input terminal of the second wavelength-selective coupler;

a second circulator connected to an output terminal of the second uni-directional optical amplifier and an input terminal of the third uni-directional optical amplifier at input and output terminals thereof, respectively; and, a mid-stage device connected between the common terminal of the first wavelength-selective coupler and the common terminal of the second circulator, the mid-stage device comprising at least one of dispersion-compensating means, optical-fiber-gain flattening means, and means for removing accumulated noise of optical amplifiers and controlling power of optical signals.

15. The optical-amplifier module of claim 14, wherein each of the uni-directional optical amplifiers is a rare earth-doped fiber amplifier, a semiconductor optical amplifier, or a Raman amplifier.

16. The optical-amplifier module of claim 14, wherein each of the wavelength-selective couplers comprises a wavelength multiplexer for coupling or separating optical signals having wavelengths of different bands.

17. The optical-amplifier module of claim 14, wherein each of the wavelength-selective couplers comprises: a circulator having an input terminal, an output terminal, and a common terminal; a first bandpass filter connected to the input terminal of the circulator and adapted to transmit an optical signal of a predetermined wavelength band, while cutting off optical signals of other wavelength bands; and a second bandpass filter connected to the output terminal of the circulator, the second bandpass filter having a passband and a cut-off band opposite to those of the first bandpass filter.

18. The optical-amplifier module of claim 14, wherein each of the wavelength-selective couplers comprises a wavelength interleaver for coupling or separating optical signals having wavelengths adjacent to each other.

19. The optical-amplifier module of claim 14, wherein each of the wavelength-selective couplers comprises: a circulator having an input terminal, an output terminal, and a common terminal; a first comb filter connected to an input terminal of the circulator having passbands or cut-off bands repeated at a predetermined interval; and, a second comb filter connected to the output terminal of the circulator having passbands or cut-off bands repeated at an interval corresponding to the interval of the first comb filter and an absolute value corresponding to half the interval of the first comb filter.

20. A bi-directional optical-amplifier module having first and second input/output ports to amplify downward/upward optical signals traveling bi-directionally, comprising:
 a first circulator connected to a common terminal thereof to the first input/output port and adapted to perform a separation/combination of optical signals passing therethrough bi-directionally;
 a first uni-directional optical amplifier connected to an input terminal thereof to an output terminal of the first circulator;
 a fourth uni-directional optical amplifier connected to an output terminal thereof to an input terminal of the first circulator;
 a first wavelength-selective coupler connected to an output terminal of the first uni-directional optical amplifier and an input terminal of the fourth uni-directional optical amplifier to input and output terminals thereof, respectively;
 a second circulator connected to a common terminal thereof to the second input/output port and adapted to perform a separation/combination of optical signals passing therethrough bi-directionally;
 a second uni-directional optical amplifier connected to an input terminal thereof to an output terminal of the second circulator;
 a third uni-directional optical amplifier connected to an output terminal thereof to an input terminal of the second circulator;
 a second wavelength selective coupler connected to an output terminal of the second uni-directional optical amplifier and an input terminal of the third uni-directional optical amplifier at input and output terminals thereof, respectively; and,
 a mid-stage device connected between the common terminals of the first and second wavelength-selective couplers, the mid-stage device comprising at least one of dispersion-compensating means, optical-fiber-gain flattening means, and means for removing accumulated noise of optical amplifiers and controlling power of optical signals.

21. The optical-amplifier module of claim 20, wherein each of the uni-directional optical amplifiers is a rare earth-doped fiber amplifier, a semiconductor optical amplifier, or a Raman amplifier.

22. The optical-amplifier module of claim 20, wherein each of the wavelength-selective couplers comprises a wavelength multiplexer for coupling or separating optical signals having wavelengths of different bands.

23. The optical-amplifier module of claim 20, wherein each of the wavelength-selective couplers comprises: a circulator having an input terminal, an output terminal, and a common terminal; a first bandpass filter connected to the input terminal of the circulator and adapted to transmit an optical signal of a predetermined wavelength band while cutting off optical signals of other wavelength bands; and a second bandpass filter connected to the output terminal of the circulator, the second bandpass filter having a passband and a cut-off band opposite to those of the first bandpass filter.

24. The optical-amplifier module of claim 20, wherein each of the wavelength-selective couplers comprises a wavelength interleaver for coupling or separating optical signals having wavelengths adjacent to each other.

25. The optical-amplifier module of claim 20, wherein each of the wavelength-selective couplers comprises: a circulator having an in put terminal, an output terminal, and a common terminal; a first comb filter connected to an input terminal of the circulator having passbands or cut-off bands repeated at a predetermined interval; and, a second comb filter connected to the output terminal of the circulator having passbands or cut-off bands repeated at an interval corresponding to the interval of the first comb filter and an absolute value corresponding to half the interval of the first comb filter.

26. A bi-directional optical-amplifier module having first and second input/output ports to amplify downward/upward optical signals traveling bi-directionally, comprising:
 a first wavelength-selective coupler connected to a common terminal thereof to the first input/output port and adapted to perform a separation/combination of optical signals passing therethrough bi-directionally;
 a first uni-directional optical amplifier connected to an input terminal thereof to an output terminal of the first-wavelength selective coupler;
 a fourth uni-directional optical amplifier connected to an output terminal thereof to an input terminal of the first wavelength-selective coupler;
 a third wavelength-selective coupler connected to an output terminal of the first uni-directional optical amplifier and an input terminal of the fourth uni-directional optical amplifier to input and output terminals thereof, respectively;
 a second wavelength-selective coupler connected to a common terminal thereof to the second input/output port and adapted to perform a separation/combination of optical signals passing therethrough bi-directionally;
 a second uni-directional optical amplifier connected to an input terminal thereof to an output terminal of the second wavelength-selective coupler;
 a third uni-directional optical amplifier connected to an output terminal thereof to an input terminal of the second wavelength-selective coupler;
 a fourth wavelength-selective coupler connected to an output terminal of the second uni-directional optical amplifier and an input terminal of the third uni-directional optical amplifier at input and output terminals thereof, respectively; and,
 a mid-stage device connected between the common terminals of the third and fourth wavelength-selective couplers, the mid-stage device comprising at least one of dispersion compensating means, optical-fiber-gain flattening means, and means for removing accumulated noise of optical amplifiers and controlling power of optical signals.

27. The optical-amplifier module of claim 26, wherein each of the uni-directional optical amplifiers is a rare earth-doped fiber amplifier, a semiconductor optical amplifier, or a Raman amplifier.

28. The optical-amplifier module of claim 26, wherein each of the wavelength-selective couplers comprises a wavelength multiplexer for coupling or separating optical signals having wavelengths of different bands.

29. The optical-amplifier module of claim 26, wherein each of the wavelength-selective couplers comprises: a circulator having an input terminal, an output terminal, and a common terminal; a first bandpass filter connected to the input terminal of the circulator and adapted to transmit an optical signal of a predetermined wavelength band, while cutting off optical signals of other wavelength bands; and, a second bandpass filter connected to the output terminal of the circulator, the second bandpass filter having a passband and a cut-off band opposite to those of the first bandpass filter.

30. The optical-amplifier module of claim 26, wherein each of the wavelength-selective couplers comprises a wavelength interleaver for coupling or separating optical signals having wavelengths adjacent to each other.

31. The optical-amplifier module of claim 26, wherein each of the wavelength selective couplers comprises: a circulator having an input terminal, an output terminal, and a common terminal; a first comb filter connected to an input terminal of the circulator having passbands or cut-off bands repeated at a predetermined interval; and, a second comb filter connected to the output terminal of the circulator having passbands or cut-off bands repeated at an interval corresponding to the interval of the first comb filter and an absolute value corresponding to half the interval of the first comb filter.

32. A bi-directional optical-amplifier module having first and second input/output ports to amplify downward/upward optical signals traveling bi-directionally, comprising:
    a circulator connected to a common terminal thereof to the first input/output port and adapted to perform a separation/combination of optical signals passing therethrough bi-directionally;
    a first uni-directional optical amplifier connected to an input terminal thereof to an output terminal of the circulator;
    a fourth uni-directional optical amplifier connected to an output terminal thereof to an input terminal of the circulator;
    a first wavelength-selective coupler connected to an output terminal of the first uni-directional optical amplifier and an input terminal of the fourth uni-directional optical amplifier to input and output terminals thereof, respectively;
    a second wavelength-selective coupler connected to a common terminal thereof to the second input/output port and adapted to perform a separation/combination of optical signals passing therethrough bi-directionally;
    a second uni-directional optical amplifier connected to an input terminal thereof to an output terminal of the second wavelength-selective coupler;
    a third uni-directional optical amplifier connected to an output terminal thereof to an input terminal of the second wavelength-selective coupler;
    a third wavelength-selective coupler connected to an output terminal of the second uni-directional optical amplifier and an input terminal of the third uni-directional optical amplifier to input and output terminals thereof, respectively; and,
    a mid-stage device connected between the common terminals of the first and third wavelength-selective couplers, the mid-stage device comprising at least one of dispersion-compensating means, optical-fiber-gain flattening means, and means for removing accumulated noise of optical amplifiers and controlling power of optical signals.

33. The optical-amplifier module of claim 32, wherein each of the uni-directional optical amplifiers is a rare earth-doped fiber amplifier, a semiconductor optical amplifier, or a Raman amplifier.

34. The optical-amplifier module of claim 32, wherein each of the wavelength-selective couplers comprises a wavelength multiplexer for coupling or separating optical signals having wavelengths of different bands.

35. The optical-amplifier module of claim 32, wherein each of the wavelength-selective couplers comprises: a circulator having an input terminal, an output terminal, and a common terminal; a first bandpass filter connected to the input terminal of the circulator and adapted to transmit an optical signal of a predetermined wavelength band, while cutting off optical signals of other wavelength bands; and, a second bandpass filter connected to the output terminal of the circulator, the second bandpass filter having a passband and a cut-off band opposite to those of the first bandpass filter.

36. The optical-amplifier module of claim 32, wherein each of the wavelength-selective couplers comprises a wavelength interleaver for coupling or separating optical signals having wavelengths adjacent to each other.

37. The optical-amplifier module of claim 32, wherein each of the wavelength-selective couplers comprises: a circulator having an input terminal, an output terminal, and a common terminal; a first comb filter connected to an input terminal of the circulator, the circulator having passbands or cut-off bands repeated at a predetermined interval; and a second comb filter connected to the output terminal of the circulator having passbands or cut-off bands repeated at an interval corresponding to the interval of the first comb filter and an absolute value corresponding to half the interval of the first comb filter.

38. A bi-directional optical-amplifier module having first and second input/output ports to amplify downward/upward optical signals traveling bi-directionally, comprising:
    a first wavelength-selective coupler connected to a common terminal thereof to the first input/output port and adapted to perform a separation/combination of optical signals passing therethrough bi-directionally;
    a first uni-directional optical amplifier connected to an input terminal thereof to an output terminal of the first wavelength-selective coupler;
    a fourth uni-directional optical amplifier connected at an output terminal thereof to an input terminal of the first wavelength-selective coupler;
    a circulator connected to an output terminal of the first uni-directional optical amplifier and an input terminal of the fourth uni-directional optical amplifier at input and output terminals thereof, respectively;
    a second wavelength-selective coupler connected to a common terminal thereof to the second input/output port and adapted to perform a separation/combination of optical signals passing therethrough bi-directionally;
    a second uni-directional optical amplifier connected to an input terminal thereof to an output terminal of the second wavelength-selective coupler;
    a third uni-directional optical amplifier connected to an output terminal thereof to an input terminal of the second wavelength-selective coupler;
    a third wavelength-selective coupler connected to an output terminal of the second uni-directional optical amplifier and an input terminal of the third uni-directional optical amplifier to input and output terminals thereof, respectively; and,
    a mid-stage device connected between the common terminal of the circulator and the common terminal of the third wavelength-selective coupler, the mid-stage device comprising at least one of dispersion compensating means, optical-fibe- gain flattening means, and means for removing accumulated noise of optical amplifiers and controlling power of optical signals.

39. The optical-amplifier module of claim 38, wherein each of the uni-directional optical amplifiers is a rare earth-doped fiber amplifier, a semiconductor optical amplifier, or a Raman amplifier.

40. The optical-amplifier module of claim 38, wherein each of the wavelength-selective couplers comprises a wavelength multiplexer for coupling or separating optical signals having wavelengths of different bands.

41. The optical-amplifier module of claim 38, wherein each of the wavelength-elective couplers comprises: a circulator having an input terminal, an output terminal, and a common terminal; a first bandpass filter connected to the input terminal of the circulator and adapted to transmit an optical signal of a predetermined wavelength band, while cutting off optical signals of other wavelength bands; and, a second bandpass filter connected to the output terminal of the circulator, the second bandpass filter having a passband and a cut-off band opposite to those of the first bandpass filter.

42. The optical-amplifier module of claim 38, wherein each of the wavelength-selective couplers comprises a wavelength interleaver for coupling or separating optical signals having wavelengths adjacent to each other.

43. The optical-amplifier module of claim 38, wherein each of the wavelength-selective couplers comprises: a circulator having an input terminal, an output terminal, and a common terminal; a first comb filter connected to an input terminal of the circulator having passbands or cut-off bands repeated at a predetermined interval; and, a second comb filter connected to the output terminal of the circulator having passbands or cut-off bands repeated at an interval corresponding to the interval of the first comb filter and an absolute value corresponding to half the interval of the first comb filter.

44. A bi-directional optical-amplifier module having first and second input/output ports to amplify downward/upward optical signals traveling bi-directionally, comprising:

a first wavelength-selective coupler connected to a common terminal thereof to the first input/output port and adapted to perform a separation/combination of optical signals passing therethrough bi-directionally;

a first uni-directional optical amplifier connected to an input terminal thereof to an output terminal of the first wavelength-selective coupler;

a fourth uni-directional optical amplifier connected to an output terminal thereof to an input terminal of the first wavelength-selective coupler;

a second wavelength-selective coupler connected to a common terminal thereof to the second input/output port and adapted to perform a separation/combination of optical signals passing therethrough bi-directionally;

a second uni-directional optical amplifier connected to an input terminal thereof to an output terminal of the second wavelength-selective coupler;

a third uni-directional optical amplifier connected to an output terminal thereof to an input terminal of the second wavelength-selective coupler;

a third wavelength-selective coupler connected to respective output terminals of the first and second uni-directional optical amplifiers to first and second input terminals thereof;

a fourth wavelength-selective coupler connected to respective output terminals of the third and fourth uni-directional optical amplifiers to first and second input terminals thereof; and, a mid-stage device connected between the common terminals of the third and fourth wavelength-selective couplers, the mid-stage device comprising at least one of dispersion-compensating means, optical-fiber-gain flattening means, and means for removing accumulated noise of optical amplifiers and controlling power of optical signals.

45. The optical-amplifier module of claim 44, wherein each of the uni-directional optical amplifiers is a rare earth-doped fiber amplifier, a semiconductor optical amplifier, or a Raman amplifier.

46. The optical-amplifier module of claim 44, wherein each of the wavelength-selective couplers comprises a wavelength multiplexer for coupling or separating optical signals having wavelengths of different bands.

47. The optical-amplifier module of claim 44, wherein each of the wavelength-selective couplers comprises a wavelength interleaver for coupling or separating optical signals having wavelengths adjacent to each other.

\* \* \* \* \*